United States Patent
Rosenquist et al.

(10) Patent No.: US 6,311,132 B1
(45) Date of Patent: Oct. 30, 2001

(54) METHOD AND APPARATUS FOR DETECTING SHALLOW WATER FLOW SANDS USING CONVERTED SHEAR WAVES

(75) Inventors: Mark L. Rosenquist, Sugar Land; Fa S. Dwan, Houston; L. Taras Bryndzia, Houston; John H. Pelletier, Houston, all of TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/413,411

(22) Filed: Oct. 6, 1999

(51) Int. Cl.[7] .................................................. G01V 1/28
(52) U.S. Cl. ................................................................ 702/14
(58) Field of Search .................................. 702/14, 16, 17, 702/18; 367/75, 21, 15

(56) References Cited

U.S. PATENT DOCUMENTS

| | | | |
|---|---|---|---|
| 4,534,019 | * 8/1985 | Williams et al. ...................... 367/75 |
| 4,839,869 | 6/1989 | Corcoran ................................ 367/53 |
| 4,870,625 | * 9/1989 | Young .................................... 367/16 |
| 4,942,557 | 7/1990 | Seriff .................................... 367/15 |
| 4,972,384 | * 11/1990 | Williams ............................... 367/75 |
| 5,274,603 | 12/1993 | Zibilich, Jr. et al. ................. 367/20 |
| 5,555,531 | 9/1996 | Booth et al. ........................... 367/15 |

\* cited by examiner

*Primary Examiner*—Donald E. McElheny, Jr.

(57) ABSTRACT

A method and apparatus for seismic detection of shallow drilling hazards, especially overpressured shallow waterflow sands. In one embodiment, a seismic survey is performed to obtain both compression and converted shear type seismic data. After processing, the seismic data is analyzed to identify possible correlations between reflection events observable in the shear seismic data and reflection events observable in the compression seismic data. At depths of up to at least 3,500 feet below the sea floor, any such correlation is indicative of the presence of sands.

12 Claims, 5 Drawing Sheets

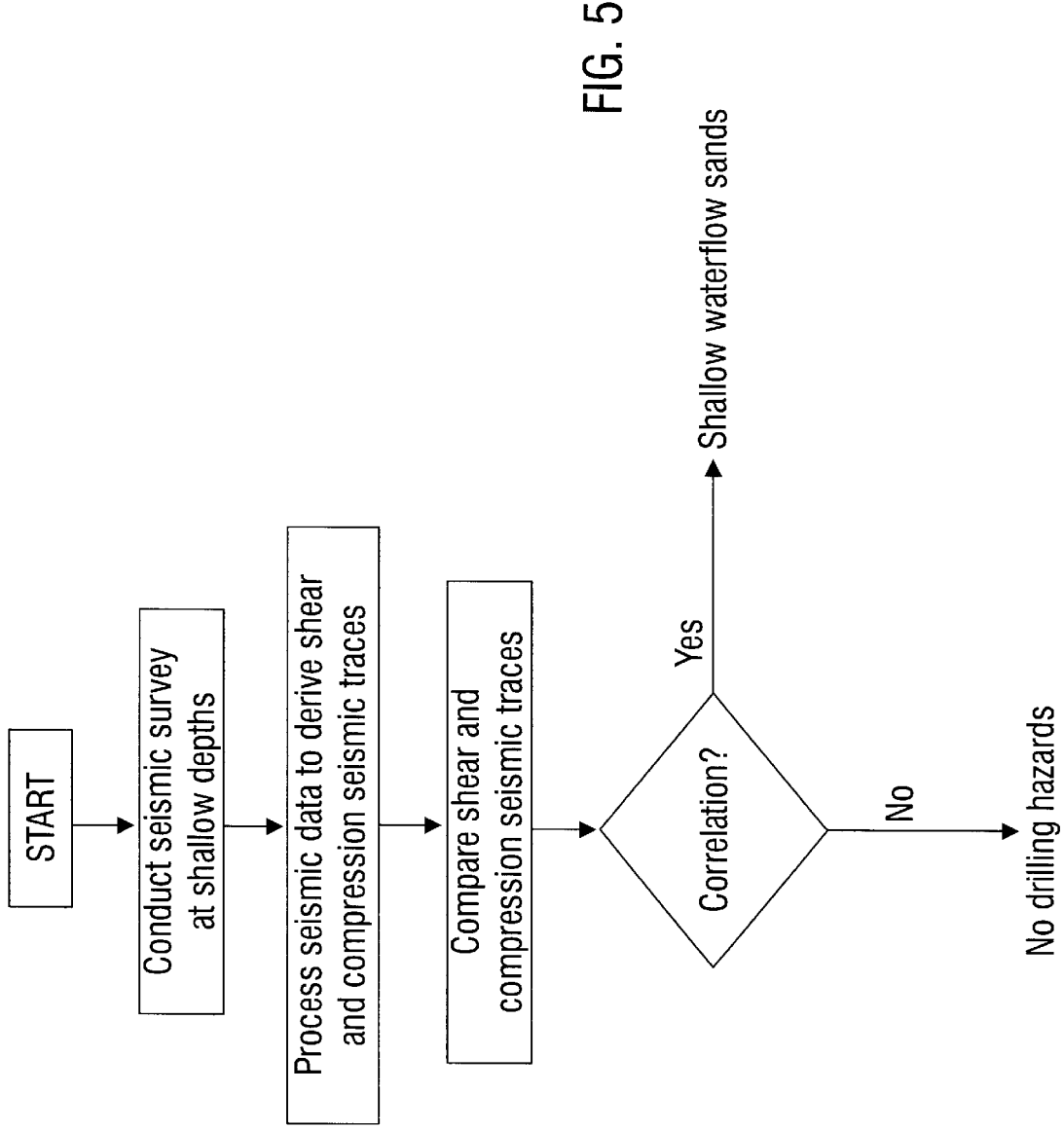

METHOD AND APPARATUS FOR DETECTING SHALLOW WATER FLOW SANDS USING CONVERTED SHEAR WAVES

FIELD OF THE INVENTION

This invention relates generally to the field of hydrocarbon exploration and production, and more particularly relates to detection of drilling hazards, especially subterranean shallow water flow sands.

BACKGROUND OF THE INVENTION

The use of seismic techniques to obtain information about subterranean geophysical features is very well-known in the prior art. Such techniques are commonly employed in the exploration for and production of hydrocarbons, e.g., natural gas and oil. The advantages and desirability of accurate characterization of subterranean features are self-evident.

Conventional compressional wave seismic land or marine acquisition techniques involve the use of an appropriate source to generate compressional energy and a set of receivers spread out along or near the Earth's surface to detect any seismic signals due to compressional energy being reflected from subsurface geologic boundaries. These signals are recorded as a function of time and subsequent processing of these signals, i.e. seismic data, is designed to reconstruct an accurate image of the subsurface. In simplistic terms, this conventional process has a compressional wave travelling down into the earth, reflecting from a particular geologic layer (due to impedance contrast), and returning to the receiver as a compressional wave. Data from such a process is referred to herein as "PP" data since compressional waves (P) propagate down from the surface (the first "P") and back up to the surface (the second "P"). In reality, many different types of waves are created in conventional acquisition schemes, and the use of receivers with their sensitive axes oriented vertically (approximately parallel to particle motion for compressional waves), as well as the subsequent processing of the recorded data are designed so that the desired type or types of waves (such as signals representing PP data) is enhanced relative to other types of waves whose signals are considered noise.

On the other hand, so-called shear wave data is conventionally acquired by using a source which introduces particle motion transverse to the direction of wave propagation and then detecting the seismic signal with receivers. Two different types of shear waves (denoted herein as "S") may be acquired: Sh, where the particle motion is perpendicular to, or across, the line from the source to the receiver or geophone; and Sv, where the particle motion is along, or in, the plane defined by the source, reflector, and receiver or geophone. While the characteristics and interpretation of these two types of shear waves may be quite different, both types of acquisition are denoted herein as SS to emphasize the symmetry resulting from the fact that both the downgoing wave (the first "S") and reflected wave (the second "S") are shear waves. Shear seismic data may provide additional information about the properties of the subsurface geologic layers which may be valuable in the exploration for hydrocarbons. See, for example, R. H. Tatham et al.; "V P/V S-A Potential Hydrocarbon Indicator", *Geophysics* 41, pp. 837–849 (1976).

Those of ordinary skill in the art will be aware that shear waves of the Sv type may also be generated by conversion from a compressional wave transmitted through or reflected from an impedance interface. In this so-called "converted shear" situation, the particle motion of the converted wave is transverse to the direction of wave propagation but in-line with respect to the source-receiver direction. These waves may be seen in conventional PP seismic records but it has been shown that their observation can be enhanced by modifying conventional compressional wave acquisition geophone axes slightly (i.e. placing geophones with their detection axes horizontally in-line rather than vertically). Seismic signals which are predominantly shear-waves may then be detected and may also be recorded. These waves arise from the partitioning of the energy of the compressional wave as it is reflected from an elastic interface. Shear waves of this type are variously referred to as converted waves, or PS waves, and are well known among exploration seismologists. See, for example, Ricker, et al., "Composite Reflections" *Geophysics* 15, pp. 30–50 (1950); see also U.S. Pat. No. 2,354,548, issued Jul. 25, 1944 to Ricker. When properly interpreted, converted shear wave data has been shown to be capable of providing information about the properties of the subsurface similar to no that provided by SS data.

There are two characteristics of converted waves (PS) which distinguish them from either conventional PP or SS waves. First, the travel path is asymmetric; compressional energy travels downward with a compressional velocity VP (Z), and after reflection travels upward with a shear velocity VS(Z). VP(Z) and VS(Z), (where Z represents the depth) are both generally functions of depth, Z, and VS is normally much less than VP. Second, since the shear velocity is usually much smaller than the compressional velocity in the same material, the velocity distribution of a converted wave (i.e. the velocities experienced by the energy travelling down and back up) is much broader than If the wave had been a pure compressional (PP) or pure shear (SS) wave over its entire path.

As is known by those of ordinary skill in the art, so-called "processed" seismic data is derived from raw seismic data by applying such conventional processing techniques as static correction, amplitude recovery, band-limiting or frequency filtering, stacking, and migration. The processed seismic data may be of either the so-called reflection coefficient data type or the integrated trace data type.

Once processed seismic data has been derived, this data must be correlated with such physical characteristics as reservoir continuity, reservoir thickness, pore fill fluid type (oil, gas, water, etc.), lithologic variation, and pay thickness, to name but a few. This correlation is commonly accomplished using seismic data (two or three dimensional) in conjunction with other inputs, such as well logs. Other ways of making this correlation include, e.g., analysis of surface out-crops and statistical modeling exercises.

Those of ordinary skill in the art will be aware that seismic techniques are traditionally employed to detect and characterize geophysical structures or features deep underground, generally in the subterranean regions where hydrocarbon deposits are likely to be found. On the other hand, seismic techniques are not traditionally employed in the oil industry for the purposes of detecting relatively shallower subterranean geophysical structures.

One type of shallow geophysical feature of particular interest is known as shallow waterflow sand. Shallow, overpressured sands constitute a severe hazard to drilling and facilities development because they tend to flow when penetrated. This causes significant drilling and cementing problems. Shallow flows can lead to washouts resulting in casing wear, buckled casing, and well re-entry problems. In some cases, shallow waterflows can breach the seafloor, resulting in loss of both the individual well and other prospect development sites. Over the years, shallow waterflow occurrences have been reported in various oil and gas fields or prospects. With a few exceptions, waterflow incidents occur at water depths exceeding 1,700feet with an average occurrence in 2,830 feet of water. In recorded cases, waterflow problem sands typically occur from 950 to 2,000 feet but have been reported as deep as 3,500 feet below the sea floor. In any event, for the purposes of the present disclosure, the term "shallow" as applied to subterranean measurements shall refer generally to various depths of up to as much as 3,500 feet or so below the sea floor.

In the Gulf of Mexico, one example of a region prone to shallow waterflow sand problems, the shallow waterflow sands were deposited as continental slope/fan sequences during the Late Pleistocene era. Individual sand-bearing units display slumping zones or debris flows with a chaotic seismic character and, in some cases rotated slump blocks. High sedimentation rates and an impermeable mud or clay seal are thought to be the main factors contributing to overpressure in shallow waterflow sands. These sands occur in a number of depositional subbasins that are generally bounded by diapirs.

The United States Minerals Management Service includes for some regions precautions for possible shallow waterflow in geophysical and geological reviews of plans and applications for permits to drill in leases where potential problems can be identified. Various mitigating approaches have been used including drilling a pilot hole in the shallow section, extra conductor casing strings, the use of "Pressure While Drilling," and other logging tools, and additional geophysical and engineering techniques. Various entities are engaged in programs to upgrade catalogs of known shallow water occurrences, improve the classification of waterflows to allow more meaningful cautionary statements, and continue to work with deepwater operators to prevent the economic loss of moving a well location due to shallow waterflow problem. Waterflow problems have been reported in a variety of depositional basins throughout the world.

Detection of the sources of waterflows seismically is a major challenge. Reprocessed conventional three-dimensional ("3D"), digitally processed high resolution two-dimensional ("2D"), and high resolution 3D short-offset processed seismic data can be used to interpret the depositional environment of waterflow zones. Enhancing the resolution of 3D seismic data is limited by, among other factors, data sampling rate, and by source and receiver depths. High frequencies can be attenuated 1500 feet below seafloor. Enhancing resolution of 3D data helps to define stratigraphy. Most of the abnormally pressured shallow aquifers do not have gas content. They are more likely to be transparent seismically. Amplitude maps or seismic cross sections do not pinpoint the source of potential waterflows although they can in some cases indicate sand prone stratigraphic units. Seismic facies analyses along with well log curves and workstation displays may help to delineate safe areas with no waterflows; often, however, such data is not available. Regional seismic stratigraphic maps of individual basins are presently the preliminary tools in identifying waterflow zones.

As noted above, conventional seismic techniques utilizing compression wave detection have not heretofore been considered effective in the detection of shallow drilling hazards. U.S. Pat. No. 5,555,531 to Booth et al., entitled "Method for Identification of Near-Surface Drilling Hazards, " proposes the use of high-resolution 3-D seismic data to identify the existence of near-surface drilling hazards. However, the techniques proposed by the Booth '531 patent appear to involve modeling only the sea floor from the seismic data, and subsequently identifying "near surface" hazards by visual analysis of the rendered surface. Such techniques would not be entirely effective for the purposes of detecting many shallow hazards, which, as noted above, when "shallow" is interpreted as meaning up to 3,500 feet below the sea floor.

SUMMARY OF THE INVENTION

In view of the foregoing considerations, the present invention is directed to a method and apparatus for seismic detection of shallow water flow sands and other shallow hazards. In one embodiment of the invention, shear wave (SS) and/or converted shear wave (PS) data is obtained for relatively shallow subsurface regions for the purposes of detecting shallow hazards.

BRIEF DESCRIPTION OF THE DRAWINGS

The foregoing and other features and advantages of the present invention will be best understood with reference to the following detailed description of a specific embodiment of the invention, when read in conjunction with the accompanying drawings, wherein:

FIG. 5 is a flow chart depicting a method for seismic detection of shallow waterflow sands and other shallow hazards.

DETAILED DESCRIPTION OF A SPECIFIC EMBODIMENT OF THE INVENTION

In the disclosure that follows, in the interest of clarity, not all features of actual implementations are described. It will of course be appreciated that in the development of any such actual implementation, as in any such project, numerous engineering and programming decisions must be made to achieve the developers' specific goals and subgoals (e.g., compliance with system- and business-related constraints), which will vary from one implementation to another. Moreover, attention will necessarily be paid to proper engineering and programming practices for the environment in question. It will be appreciated that such a development effort might be complex and time-consuming, but would nevertheless be a routine undertaking for those of ordinary skill in the field of geophysical exploration and production.

Figure 1:
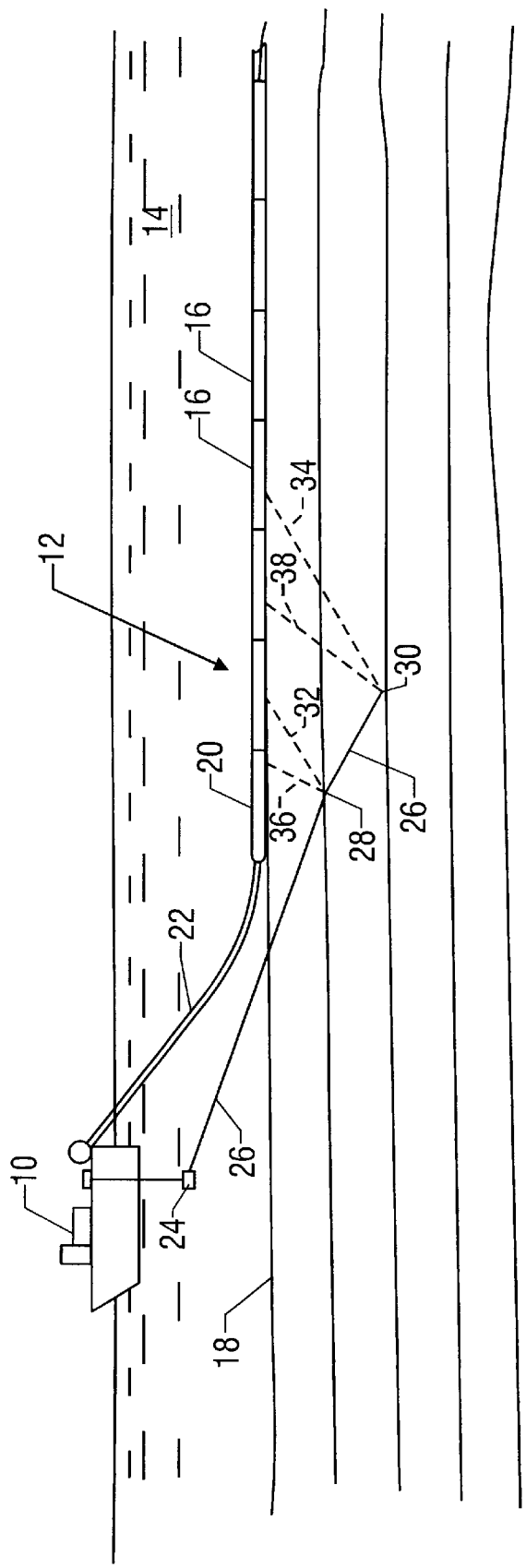
FIG. 1 is a diagram illustrating a seismic survey system in accordance with one embodiment of the invention.

Referring to FIG. 1, a seismic exploration vessel 10 is shown deploying a marine bottom cable 12 to seismically explore the substrata beneath body of water 14. Cable 12 can be quite lengthy, for example, a mile or more, and is normally composed of a number of individual active sections 16 connected end-to-end. Each section 16 contains a hydrophone and a plurality of geophones (not shown) and is positioned adjacent bottom 18. Cable 12 can be positioned on bottom 18 in the desired location by dragging it to the desired location or by reeling it in and then unreeling it at the desired location as vessel 10 moves forward. A marine bottom cable suitable for the purposes of practicing the present invention is disclosed in U.S. Pat. No. 4,942,557 to Seriff, entitled "Marine Seismic System." Another bottom cable suitable for the so purposes of the present invention is disclosed in U.S. Pat. No. 5,274,603 to Zibilich, Jr. et al., entitled "Marine Seismic Cable Section Assembly." The Seriff '557 patent and Zibilich, Jr. 603 patent are each hereby incorporated by reference herein in their respective entireties.

Section 20 of cable 12, which is connected to the first section 16, is a weighted section containing, for example, lead or other suitable material. Lead-in section 22, which can be an armored cable, connects section 20 to vessel 10. Section 20 should contain sufficient weight so that the waves in body of water 14 acting on vessel 10 and lead-in section 22 do not tend to decouple sections 16 from bottom 18. If desired, the tail end of cable 12 can also be provided with a weighted section 20 and a suitable location buoy, as is known in the art.

Figure 2:
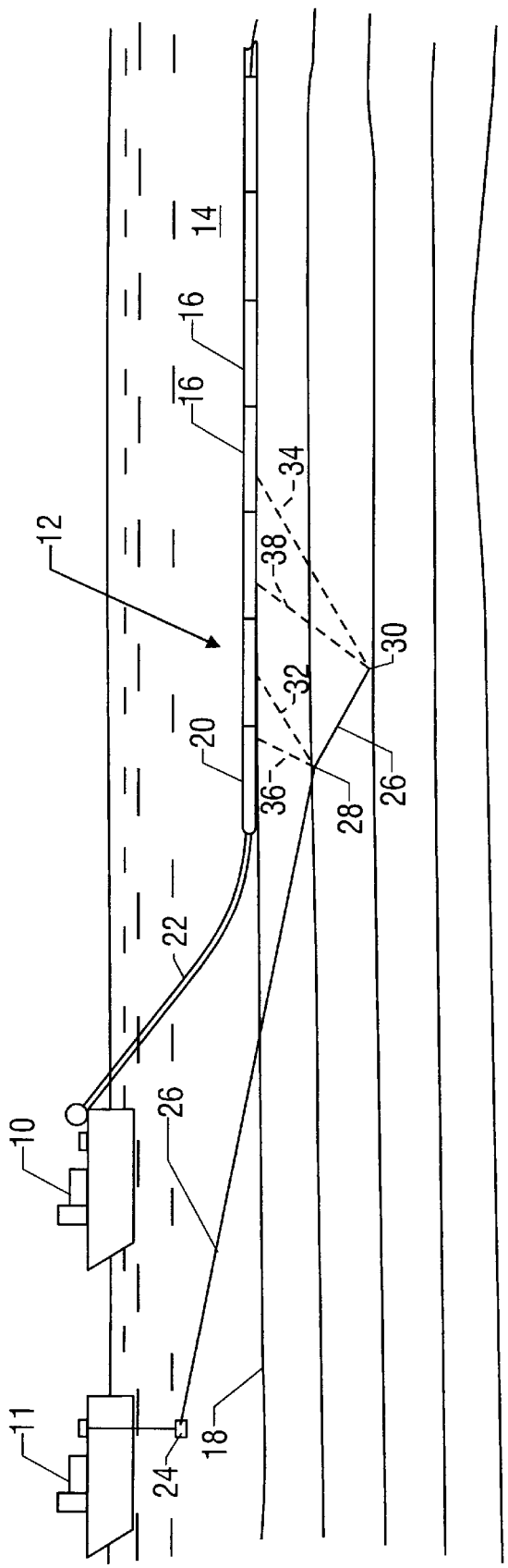
FIG. 2 is a diagram illustrating an alternative seismic survey system in accordance with one embodiment of the invention.

Compressional wave energy is provided in the vicinity of cable 12 by an air gun 24 or other suitable means; air gun 24 can be deployed from vessel 10 or a second vessel as indicated in FIG. 2, which can move in the vicinity of the geophones without moving cable 12. When air gun 24 is deployed, it can be useful to record many explosions taken over a path parallel to cable 12 and extending beyond the ends thereof without moving cable 12. The paths of vessel 11 may extend beyond the ends of cable 12, for example, to a distance of the same order of magnitude as the depth of the deepest strata to be studied. Compressional wave 26, which is generated by air gun 24 and is indicated by a straight line, travels downwardly through body of water 14 and the earth with a portion of it being reflected upwardly at points where there is a contrast in the acoustic impedance between layers of the strata, for example, points 28 and 30, where a portion of compressional wave 26 is reflected upwardly as indicated by reflected compressional waves 32 and 34. The size of such a reflection is related primarily to the contrast in compressional wave acoustic impedance. In addition, converted shear waves 36 and 38 are reflected at points 28 and 30 respectively.

The strength or amplitude of converted shear waves 36 and 38 are related primarily to the contrast in shear wave acoustic impedance. Reflected shear waves 36 and 38 travel upwardly through the strata and are detected by the geophones located in sections 16 of cable 12. The electric signals produced by the geophones in response to the reflected shear waves are transmitted along wires in cable 12 to suitable recording and/or processing equipment located on vessel 10. In addition, if desired, hydrophones or other compressional wave transducers, for example, geophones detecting vertical motion, can be positioned in active sections 16 to detect reflected compressional waves 32 and 34. It is also possible to position geophones in cable 12 to detect horizontal motion that is perpendicular to cable 12.

In the presently disclosed embodiment, the geophones associated with each section 16 of cable 12 are preferably of the so-called three-component or "3C" type capable of detecting shear waves in any direction.

Those of ordinary skill in the art will appreciate that the seismic survey techniques described herein are essentially in accordance with known practices. However, those of ordinary skill in the art will further appreciate that such techniques have heretofore not been brought to bear on the problem of detecting shallow hazards, including shallow waterflow sands, craters, faults, deep or shallow seated sea-floor faults, fluid expulsion craters, shallow-seated landslide scars, rock outcrops, and the like. More frequently, surface scan sonar techniques are used for detecting some types of shallow geophysical hazards, but such techniques provide essentially no information about certain other shallow hazards, including shallow waterflow sands.

The present inventors, on the other hand, have discovered that shear-wave seismic data, including both S-S data and P-S shear wave data can be used to detect shallow hazards, including without limitation, overpresssured sands that are difficult to detect with conventional compressional wave seismic techniques. Thus, the present invention enables the detection and location in depth of such shallow hazards, in advance of drilling, for the purposes of planning the drilling program for the well and mitigating uncontrolled flows and their adverse effects, including but not limited to uncontrolled flows around the well casing to the surface. In accordance with the present invention, therefore, the raw seismic data is preferably processed so as to emphasize to the maximum extent possible the data corresponding to shear waves reflected off of geophysical features in the "shallow" region of interest, from zero to 3,500 feet or so below the sea floor. Those of ordinary skill in the art will be familiar with numerous seismic data processing techniques and methodologies suitable for accomplishing this, and the particulars of the data processing shall not be described in further detail herein.

Figure 3:
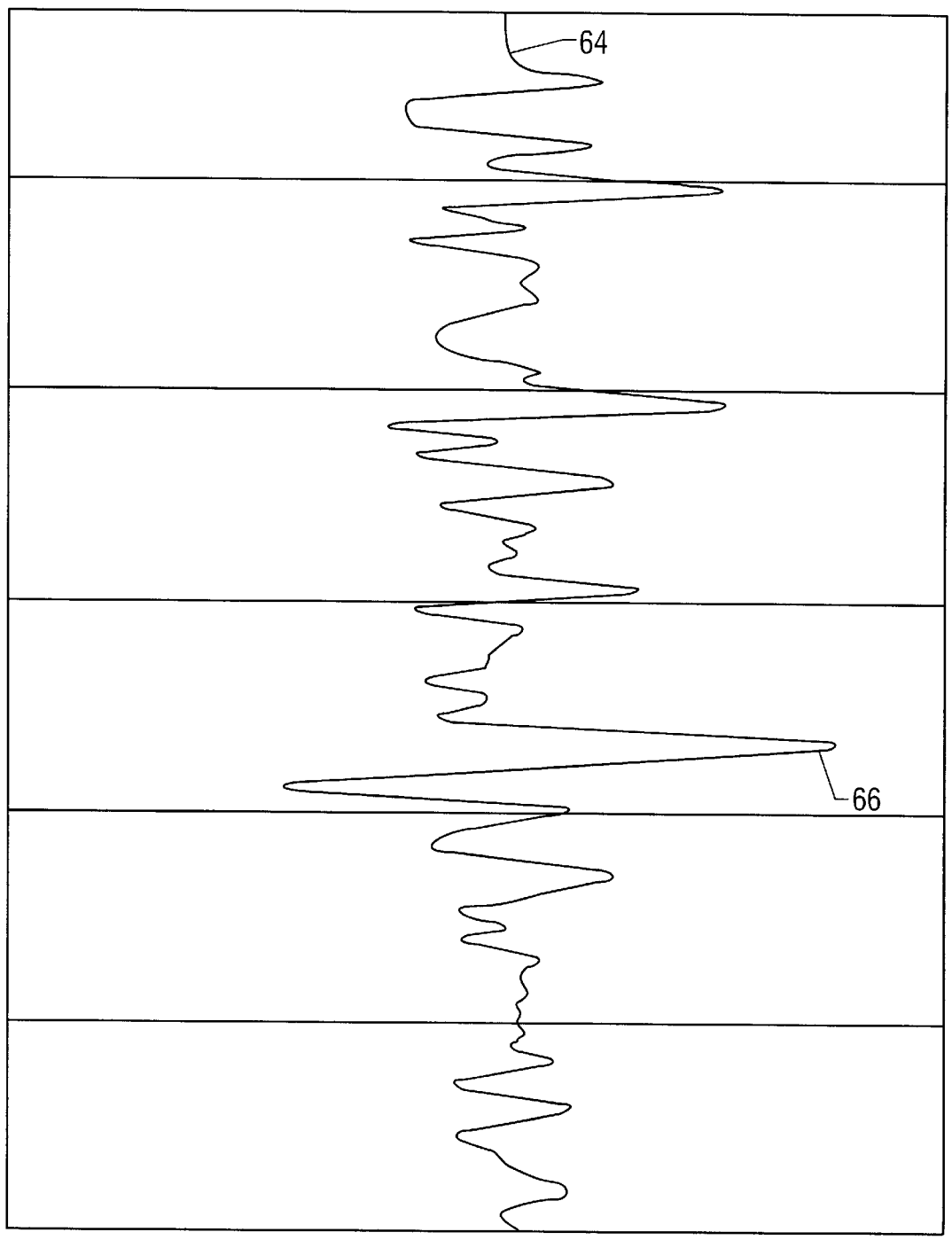
FIG. 3 is an enlarged view of a single seismic data trace.

In FIG. 3, there is shown an enlarged portion of a single vertical seismic trace 64 representing a seismic signal detected by a single seismic detector. Trace 64 in FIG. 3 may be from either a compression wave detector or a shear wave detector. In either case, those of ordinary skill in the art will appreciate that such seismic traces are interpreted by seismologists through observation of deflections such as the deflection designated with reference numeral 66 in the example of FIG. 3. Such seismic trace deflections correspond to what are referred to as "reflection events," which occur when seismic energy is reflected off of interfaces between regions of differing seismic impedance.

Figure 4:
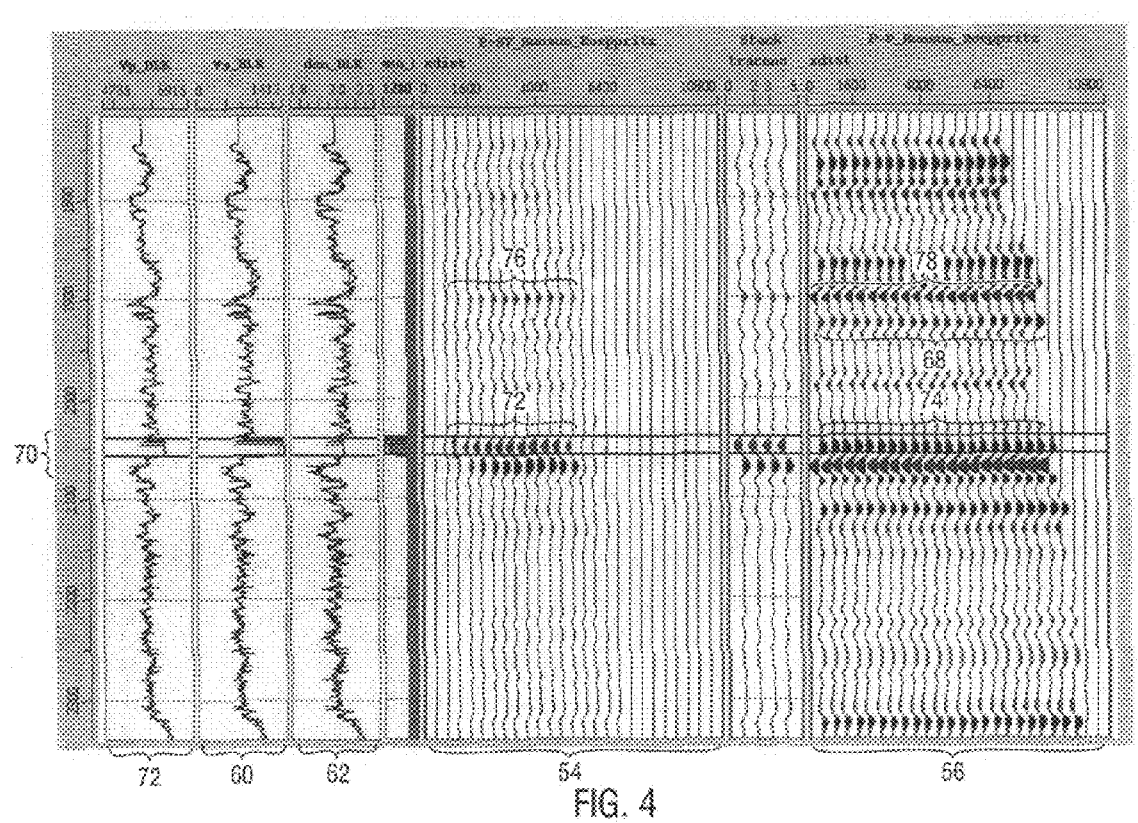
FIG. 4 is a plot of seismic data including modeled seismograms and well logs at an exploration site having a shallow waterflow sand region therebeneath.

Turning now to FIG. 4, there are shown exemplary modeled seismograms illustrating the effectiveness of the present invention in detecting shallow waterflow hazards using shear wave data acquired in accordance with the techniques described herein. These synthetic seismograms are generated using rock properties for a location where shallow waterflow sand was encountered in the course of drilling a well. Those of ordinary skill in the art will appreciate that the seismic compression and shear response can be modeled and predicted mathematically from the elastic rock properties of the rocks in the subsurface—their densities, shear velocities, and compressional velocities. The rock properties upon which FIG. 4 is based are obtainable from measurements made in the borehole of a well by modeling of rock properties in sediments typical of those in which shallow waterflows occur.

In FIG. 4, the seismogram designated generally with reference numeral 54 represents the mathematical prediction of converted shear wave data from various depths at a single map location. Those of ordinary skill in the art will appreciate that each vertical line (a seismic trace) in seismogram 54 represents a seismic shear wave signal detected by a single detector. The set of seismic traces designated collectively by reference numeral 54 represents a suite of shear wave measurements of the same subsurface location by a suite of shot-receiver pairs of varying separation. The shot-receiver separation varies from zero to 10,800 fee from left to right in seismogram 54.

Similarly, the seismogram designated generally with reference numeral 56 in FIG. 4 represents reflected compression wave data from various depths and for a range of shot-to-receiver distances.

Also shown in FIG. 4 are a velocity log for detected compression waves (designated generally with reference numeral 58), a velocity log for detected shear waves (designated generally with reference numeral 60), and a density log 62 for the site under exploration. It is to be understood that although FIG. 4 is merely an illustrative example, and represents "synthetic" seismograms 54 and 56 modeled or predicted mathematically from the available rock property data obtained from actual drilling, the present invention is intended to be applied to actual seismic data obtained in conventional ways, where no rock property data is otherwise available. That is, those of ordinary skill in the art will appreciate that logs 58, 60, and 62 are only available once drilling actually takes place, whereas the present invention is directed toward detection of shallow waterflow sands prior to drilling, i.e., without the benefit of velocity and density logs. Logs 58, 60, and 62 are provided in FIG. 4 merely for the purposes of demonstration, as will hereinafter become apparent.

With continued reference to FIG. 4, numerous reflection events can be observed in compression seismogram 56, such as those designated with reference numerals 68, 74, and 78. From drilling results, it is known that only one of these events, event 74, corresponds to a sand deposit, and that all of the other events are reflections from various different types of mudrocks. Notably, in compression seismogram 56, the sand event 74 is not readily distinguishable from the mudrock reflections.

In accordance with a notable aspect of the present invention, on the other hand, the sand event designated with reference numeral 72 in shear seismogram 54 is readily distinguishable from all of the mudrock events by virtue of having a much stronger deflection (i.e., higher amplitude).

Those of ordinary skill in the art having the benefit of the present disclosure will recognize that neither shear seismogram 54 nor compression seismogram 56 standing alone would enable a seismologist to discern the presence of overpressured sand at depth 70. In accordance with one aspect of the invention, therefore, the comparison of relative amplitudes of events in the shear wave data (shear seismogram 54) and the compression wave data (compression seismogram 56) is undertaken to identify sands in the shallow subsurface. An important indicator of sand is a shear event of large amplitude relative to other shear events in shear seismogram 54 without a corresponding disparity observable in the compression seismogram 56. For example, in FIG. 4 it is apparent that reflection 72 in shear seismogram 54 has a large amplitude relative to shear reflection 76. In contrast, the same two subsurface reflectors appear as nearly equal amplitude events 74 and 78 in compression seismogram 56.

From the foregoing detailed description of a specific embodiment of the invention, it should be apparent that a method and apparatus for detection of shallow waterflow sands has been disclosed. The disclosed method and apparatus involves identification of a distinctive correlation between reflection events in converted shear wave data and compression wave data for a seismic exploration site.

Although a specific embodiment of the invention has been disclosed herein in some detail, this has been done solely for the purposes of illustrating various aspects and features of the invention, and is not intended to be limiting with respect to the scope of the invention. It is contemplated that various substitutions, alterations, and/or modifications, including but not limited to those design alternatives which might have been specifically noted in this disclosure, may be made to the disclosed embodiment without departing from the spirit and scope of the invention as defined in the appended claims.

What is claimed is:

1. A method of detecting shallow waterflow sands, comprising:
   (a) obtaining seismic data corresponding to geophysical structures at an exploration site;
   (b) processing said seismic data to derive at least one shear seismic trace corresponding to converted shear waves detected at said exploration site and to derive at least one compression seismic trace corresponding to compression waves detected at said exploration site;
   (c) comparing said at least one shear seismic trace with said at least one compression seismic trace to identify a correlation between said at least one shear seismic trace and said at least one compression seismic trace indicative of said shallow waterflow sands.

2. A method in accordance with claim 1, wherein said correlation comprises a reflection event observable in said at least one shear seismic trace and a corresponding reflection event observable in said at least one compression seismic trace.

3. A method in accordance with claim 2, wherein said reflection event observable in said at least one shear seismic trace and said reflection event observable in said at least one compression seismic trace correspond to seismic reflections occurring between zero and at least about 3,500 feet below the surface of the earth.

4. A method in accordance with claim 2, wherein said reflection event observable in said at least one shear seismic trace and said reflection event observable in said at least one compression seismic trace are of substantially the same magnitude.

5. A method of detecting drilling hazards depths between zero and at least about 3,500 feet below a sea floor, comprising:
   (a) conducting a seismic survey above said sea floor to obtain seismic data corresponding to geophysical structures below said sea floor;
   (b) processing said seismic data to detect shear waves and compression waves reflected off of said geophysical structures; and
   (c) displaying said seismic data such that any of said drilling hazards are detectable based on the appearance of said displayed seismic data.

6. A method in accordance with claim 5, wherein said geophysical structures include shallow water flow sands.

7. A method in accordance with claim 5, wherein said step of conducting a seismic survey comprises:
   (d) disposing a plurality of multi-component seismic sensors substantially on said sea floor;
   (e) directing compressional wave energy into said sea floor in the vicinity of said sensors such that compressional and shear waves are reflected off of said geophysical bodies; and
   (f) detecting, at said plurality of seismic sensors, said reflected shear waves.

8. A method in accordance with claim 5, wherein said step of conducting a seismic survey comprises:
   (d) disposing a plurality of multi-component seismic sensors substantially on said sea floor;

(e) directing shear wave energy into said sea floor in the vicinity of said sensors such that shear waves are reflected off of said geophysical bodies; and (f) detecting, at said plurality of seismic sensors, said reflected shear waves.

9. An apparatus for detecting shallow waterflow sands, comprising:

at least one source for directing seismic energy toward a seismic objective;

at least one detector of seismic energy disposed in the vicinity of said seismic objective and adapted to generate seismic data corresponding to reflected seismic waves reflected off of subterranean seismic impedance boundaries at said objective;

a seismic data processor for deriving from said seismic data at least one shear seismic data trace in which shear wave reflection events are observable and for deriving from said seismic data at least one compression seismic data trace in which compression wave reflection events are observable;

such that a shallow waterflow sand region in said objective is detectable through a correlation between said at least one shear seismic data trace and said at least one compression seismic data trace.

10. An apparatus in accordance with claim 9, wherein said at least one detector of seismic energy is disposed upon a bottom seismic receiver.

11. An apparatus in accordance with claim 10, wherein said at least one detector is a multi-component detector adapted to detect converted shear waves.

12. An apparatus in accordance with claim 9, wherein said shallow waterflow sand region is between zero and at least about 3,500 feet below the surface of the earth.

* * * * *